(No Model.) 3 Sheets—Sheet 3.
J. H. BARLEY.
HARROW.
No. 339,835. Patented Apr. 13, 1886.
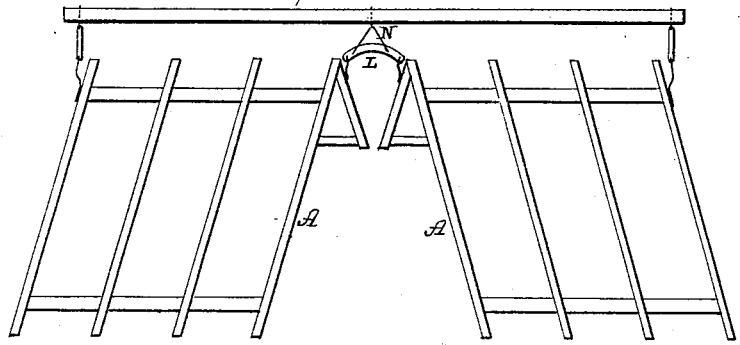
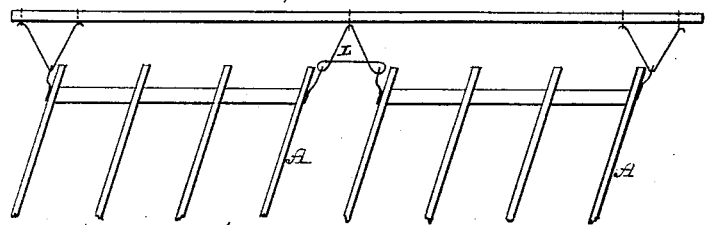
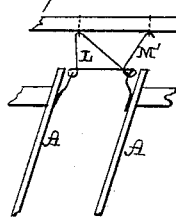 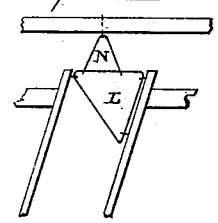 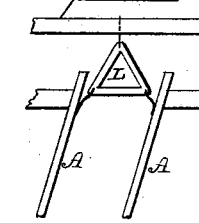 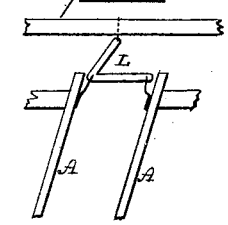
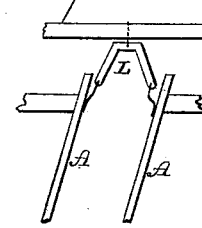 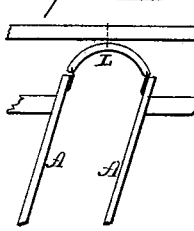 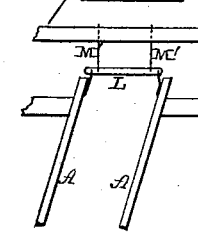 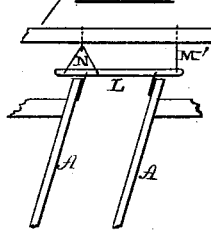
Witnesses.
R. F. Gardner
L. L. Burket.
Inventor.
Jas. H. Barley,
per F. A. Lehmann,
atty

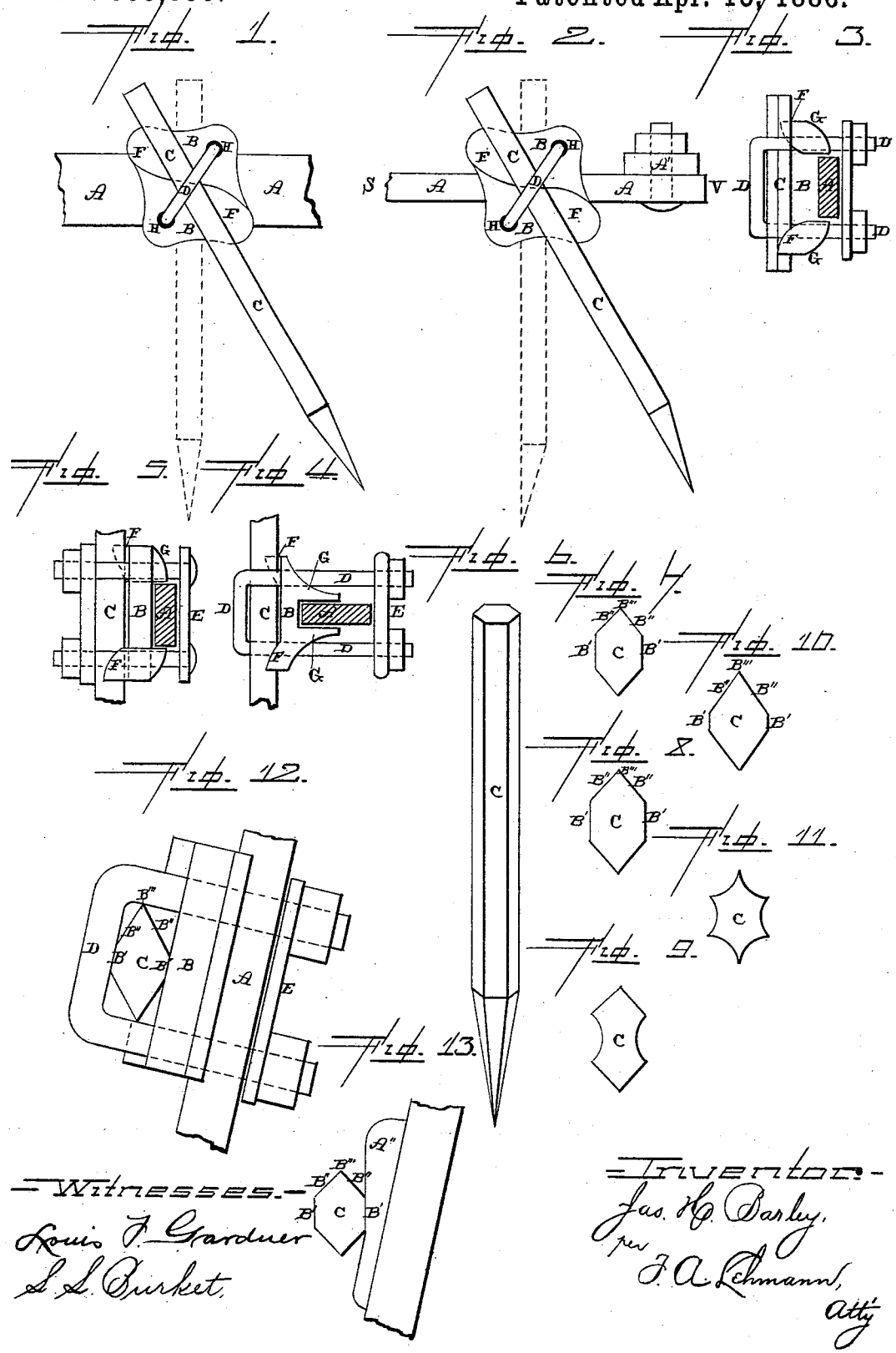

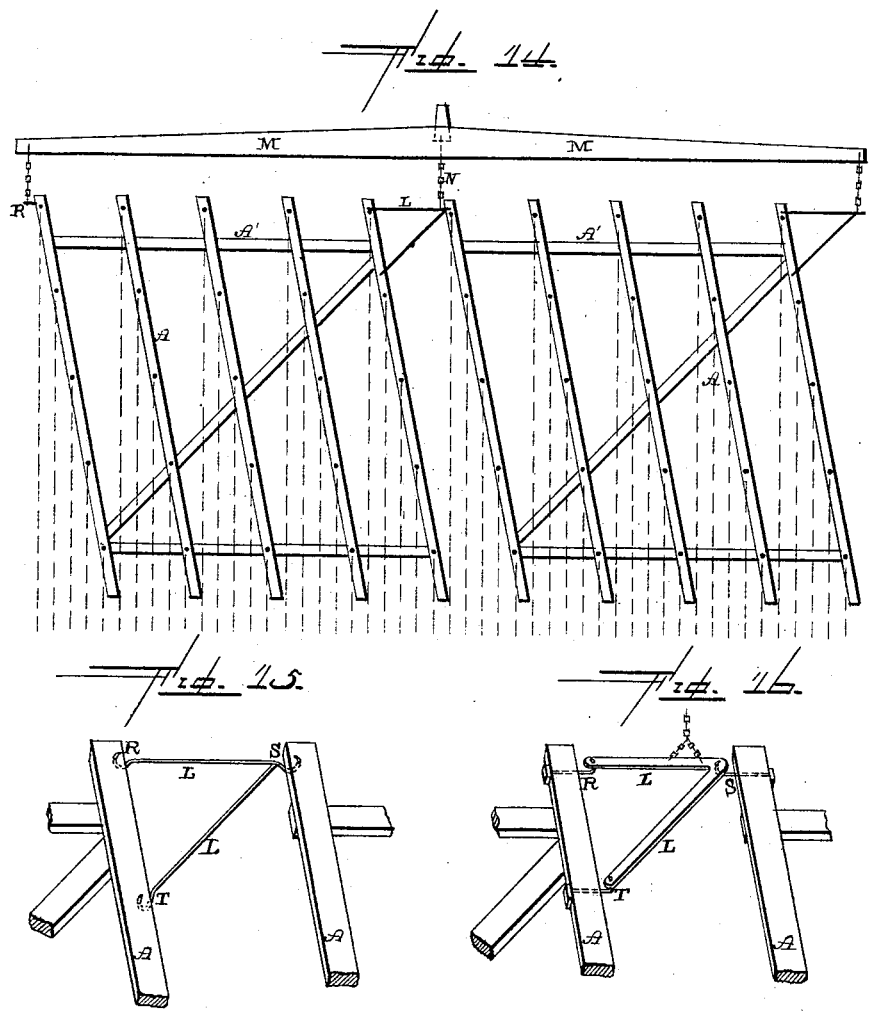

UNITED STATES PATENT OFFICE.

JAMES H. BARLEY, OF SEDALIA, MISSOURI, ASSIGNOR OF ONE HALF TO THOMAS K. BARLEY, OF SAME PLACE.

HARROW.

SPECIFICATION forming part of Letters Patent No. 339,835, dated April 13, 1886.

Application filed July 16, 1885. Serial No. 171,790. (No model.)

*To all whom it may concern:*

Be it known that I, JAMES H. BARLEY, of Sedalia, in the county of Pettis and State of Missouri, have invented certain new and useful Improvements in Harrows; and I do hereby declare the following to be a full, clear, and exact description of the invention, such as will enable others skilled in the art to which it pertains to make and use it, reference being had to the accompanying drawings, which form part of this specification.

My invention relates to an improvement in harrows; and it consists, first, in a harrow-tooth having flat bearing sides and two beveled cutting-edges; second, in the peculiar device for uniting the sections of the drag-harrow to the draft-bar, so as to prevent their rear ends from swinging laterally when an obstacle or rough ground is encountered; third, in the manner of uniting the inner front corners of each adjoining section of the drag-harrow together and to the draft-bar, so that each oblique section may be raised independently one of the other and still retain their relative position to each other when an obstacle or rough ground is encountered, and without the intervention or use of hinge-connections between the rear ends of said sections which move forward obliquely to the line of travel; fourth, in the combination of a harrow composed of two or more sections placed side by side, with the beams of each section arranged obliquely in opposite directions on either side of the central line of travel, with the hinged connection which unites the inner front corners of the adjoining sections together and to the draft-bar, so that the beams of each section will move forward obliquely to said line of travel, permitting independent motion between said sections in a vertical direction only; fifth, in the combination of the reversible harrow-tooth, supporting-plate, and clamp, as will be more fully described hereinafter.

In the annexed drawings, Figure 1 is a front elevation of one of my improved reversible harrow-tooth fastenings, showing the tooth and plate clamped to the side of the beam, the tooth being shown at different angles. Fig. 2 is a similar view of the plate, showing it adapted to be attached to a harrow with a wide beam. Figs. 3, 4, and 5 are detail sectional views taken through the beam, showing the mode of attaching the plate and tooth thereto. Fig. 6 is a perspective of my improved harrow-tooth. Figs. 7, 8, 9, 10, and 11 are plan views of modifications thereof. Fig. 12 is a detail plan view of the beam, the harrow-tooth thereon being so constructed as to have its edges in the line of draft and its bearing sides formed at an angle thereto. Fig. 13 is a modification in which the bearing-plate is beveled at the point against which the bearing side of the tooth rests, for the purpose of accomplishing the same result. Fig. 14 is a top plan view of a sectional harrow with the beams thereof arranged to operate obliquely to the line of travel, showing the hinge extension or connection which unites the sections together at their front ends and connects them to the draft-bar in front thereof. Figs. 15 to 26, inclusive, are detailed views of the hinged connection. Fig. 17 also shows a top plan view of a sectional harrow with the hinge-connection adapted and applied to the front end of the sections, having the beams thereof arranged to operate obliquely in opposite directions on either side of the central line of travel.

A represents the harrow-beam, and B the reversible tooth-fastening plate. This plate is provided with stops F, which are formed on opposite diagonal corners of the plate, so as to hold the tooth in a slanting position. The stop-flanges G are formed on the inner side of the plate at the top and bottom edges thereof, and these flanges are adapted to bear against the upper and lower edges of the beam, and thus secure the plate thereto. In opposite diagonal corners of the plate are formed the openings or notches H. The tooth C is placed on the face of the plate, and the plate is then placed on the beam. The prongs of the clamping-bolt D are passed through the opening H in the plate, with one of the prongs above and the other below the beam, and these prongs are provided with threads and nuts, as shown. The clamping-bar is placed over the ends of the clamping-bolts, and by screwing down the nuts the tooth and plate are securely clamped in position upon the beam, and at the same time allow the tooth an easy pivotal movement. The clamping device is arranged in an oblique direction across the face of the plate, so that the prongs of the clamping-bolt will allow the tooth to stand in a vertical position when the harrow is drawn from the end marked V in Fig. 2; but when the motion of the harrow is reversed to the direction marked S in said figure the resistance of the soil against the lower portion of said tooth will cause it to automatically reverse and stand in the slanting position shown in solid lines. The greatest strain, when the parts are constructed in the usual manner, always comes against the tooth-fasteners when all the teeth are working in a vertical position; but by the arrangement here shown of the plates and the clamping-bolts this strain will come against the bolts and on the two edges of the beams, instead of the plates alone, which construction admits the plates being made much lighter than has been practical heretofore.

When it is desired to attach the plates to the edges of the horizontal beam, I make the flanges G much longer than when they are to be employed in connection with vertical beams, and thus form bearing-surfaces of sufficient size to hold the plate rigidly on the beam. This modification is shown at Fig. 4.

In practice I find it to be much simpler, cheaper, and stronger to form the harrow-sections by placing the beams horizontally, as in Fig. 4, and forming a hole through each end of the beams, bolt or rivet them to the cross-bars A', as shown in Figs. 2 and 14.

In Fig. 5 I illustrate a modification of the clamping device, in which two separate and independent bolts are used, and two clamping-plates, B E, instead of having a clamp formed of one continuous piece of metal, as heretofore described, either one of which is equally well adapted to the purpose for which they are intended. When the beams are placed in a vertical position, and it is necessary they should be wider and stronger than is ordinarily required, it is not necessary to make the plates B any greater in diameter than to maintain sufficient strength in them, as the plates can be clamped to the sides of the beams by passing the clamping-bolts through the beams, the arms of the clamping-bolts holding the plate in place and allowing the tooth the same pivotal movement as when used on a narrow beam. When thus employed, the stop-flanges G on the plates are dispensed with, as the arms of the clamping-bolt will lock the plate rigidly in place without them.

I do not confine myself to supporting the tooth in a vertical position by the prongs of the clamping-bolt, as herein mentioned, as it is obvious that when wide beams are used without the stop-flanges G the plate can be so arranged in position on the side thereof that the stop F on the plate will support the tooth in the vertical position, while the prongs of the clamp will support it in a slanting position.

By the construction of the plate and clamping device as heretofore described, I gain a sixfold advantage in the use of said device, to wit: first, they clamp both plate and tooth securely to the beams and allow the tooth an automatic movement; second, the two arms of the clamping device pass through the edge of the plate on opposite sides of the teeth, and with the bolt-prongs, resting on the top and bottom edges of the narrow beams, hold the teeth when they are working in a vertical position, thus relieving the plate from undue strain; third, they serve the purpose of locking the plates rigidly on the wide beams, and thus prevent them from turning out of their places; fourth, when narrow beams are in use, either vertical or horizontal clamping-bolts pass through the edges of the plates and straddle over the beams, clamping the teeth and plate in place, thus dispensing with the necessity of making bolt-holes through the beams for the clamping-bolts to pass through; fifth, these teeth-fastenings do not require teeth to be made specially to fit them, as the openings in the clamp are sufficiently large to take in teeth that are in ordinary use; sixth, when reversible tooth-harrows are wanted with beams containing a greater or less number of teeth, each beam can be spaced or marked off at given points to correspond to the largest number of teeth that will ever be employed.

As shown in Figs. 6, 7, 8, and 10, my harrow-teeth are provided with flat bearing-surfaces B', diagonal sides B'', and cutting-edges B'''. The advantage of the flat sides B' is to provide bearings or rests for the bolts, which will prevent the teeth from turning on the plate and throwing the cutting-edges out of the line of draft, as it would be liable to do were the bearing sides not employed.

In Figs. 12 and 13 the beam is shown at the correct angle to the line of draft.

In Fig. 12 the harrow-tooth is shown as provided with oblique-angled bearing-surfaces, which are so arranged as to place the cutting-edges of the teeth directly in the line of draft. Fig. 13 shows a different mode of obtaining the same result, which consists in forming a bearing-plate, A'', with an oblique bearing-edge.

In Fig. 14 the harrow is constructed of two sections, which form an oblique-angled parallelogram arranged side by side, with their front ends parallel with the draft-bar, so that the beams will move forward in an oblique direction to the line of travel. The spaces between each section are the same as the spaces between the beams composing the sections, and the teeth of each beam cut the space of ground between them, as shown by the dotted lines of draft in said figure.

Fig. 17 shows the harrow constructed of two sections, which also form oblique-angled parallelograms arranged side by side, with the beams of each section arranged to stand obliquely in opposite directions from the central line of travel, and on opposite sides thereof, with the hinged connection which unites the inner front ends of the sections together and to the draft-bar in front, so that the beams of each section will move forward obliquely to said line of travel. The spaces between the rear ends of the sections are wider apart than the spaces between the beams comprising said sections.

In order to make the sections of the harrow maintain their proper relative positions each one with the other when the rear front sides of the oblique sections come in contact with obstructions or rough ground is encountered, and to prevent their rear ends from swinging around out of place, it is essential to make special provision to prevent their displacement, which end I attain by the use of the hinged connection L. This hinged connection may be so constructed and arranged as to extend the hitching-point out from the front side of the edges of the sections to or near the line of travel with that of the rear corners of the oblique beams, and at this line unite the sections to the draft-bar, or otherwise arrange said connections as shown, to attain the desired result. The extension or connection L unites the sections together in front, and to the draw-bar M is an arm of the extension L, which is connected to the left section at R. The chain or bail N is connected to the extension L, and unites the sections to the draw-bar. When iron beams are used horizontally, holes are formed in them at R S T, and the hook ends of the extension-arms are placed in these holes, forming a loose hinge between the sections, as shown in Fig. 15, and when the beams are used vertically the extensions L are connected to the sides of the sections by the use of suitably-constructed hooks or eyebolts.

I do not confine myself to using the arm M', as shown, between the sections, as it may be arranged to extend forward and be connected to the draft-bar in front, as shown; or said arm may be dispensed with. Neither do I restrict myself to any particular form or shape of constructing said hinge extension or connections L, as it is obvious that various shapes may be adopted and used, a number of detail views of which are shown in Figs. 15 to 26, inclusive, differing but slightly from each other only in shape or form of construction, either one of which fully accomplishes the end herein sought, which is uniting the inner front ends of the harrow-sections together and to the draft-bar by a hinge-joint connection, as before mentioned. By this means each section of the harrow is connected to the adjacent one at its side, so that they cannot possibly close upon each other at their rear ends when an obstacle or rough ground is encountered, as before mentioned, and each section will be free to move up and down on rough ground. This construction also permits the rear end of each section to be raised from the ground for the purpose of cleaning the teeth from accumulated rubbish without interfering with the other adjoining section or sections. If desired, the connections L may be rigidly connected to the front corner of one section and hinged to the adjoining one, and unite the sections to the draft-bar; but in doing this the independent vertical motion between the harrow-sections at their front ends would be destroyed, which would be objectionable.

Fig. 18 shows the extension-coupling L made of a continuous piece of wire of a triangular shape in outline, with eyes formed at each of its rear corners, where it is hinged to corners of the adjoining sections, and having its front corner hinged to the rear side of the draft-bar. This figure also shows the two outer front connections, which connect the corners of the sections to the ends of said draft-bar, which is made of a V shape, having their two ends attached to the draft-bar and the rear end or middle portion connected to the corners of the sections, as shown. Fig. 19 also shows the extension-coupling L made of wire, which is slightly varied in shape from what it is shown at Fig. 18, and is provided with an arm, M', attached to the corner of one of the sections and extending forward obliquely, and, with said connection L, unites the sections to the draft-bar at two points. In Fig. 20 the extension-coupling L is formed in a triangular shape and hinged between the front ends of the sections, with the front side thereof even with the ends of said sections, and connects the harrow to the draft-bar by a rod or forked link, N. In Figs. 21, 22, and 23 the extension or coupling L is also formed in a triangular shape, of flat iron suitably perforated at their three connecting points, where it is hinged to the sections and to the draft-bar. Fig. 24 shows extension L made in a curved shape, of flat iron, and also perforated at the points of connection. Fig. 25 shows extension L made of a straight flat bar of metal perforated at and near each of its ends, and is connected to the sections and to the draft-rod by two rods or arms, M' M'. Fig. 26 is about the same as Fig. 25, with the exception that ends of the extension-bar project beyond the ends of the two beams and is perforated and hinged thereto, and also connected to the draft-bar at one end by a bail, N, and to the other end connected by a rod or arm, M', as shown.

I am aware that heretofore harrow-teeth have been attached to the beams by the use of clips or staple-bolts, which pass over the edges of the beams, holding the teeth rigidly in a vertical position, so that they have no pivotal movement to allow them to reverse and to stand in a slanting position; but they are capable of being used only in a single position at right angles to the beam on which they are attached, as shown in Patent No. 245,052.

I am aware that harrow-teeth have been clamped between two recessed plates by a staple-bolt at whatever position selected, so the teeth will have no pivotal movement; but they are only capable of being changed by hand from one position to another, and this I disclaim.

I am also aware that various harrows have been patented with hinged connections, some of which are placed in front; but the sections and their connections are differently constructed and arranged, and said connections serve a different purpose from the hinge-connection here shown and described.

This application is a continuation or substitute for the application filed by me May 3, 1884, Serial No. 133,356.

Having thus described my invention, I claim—

1. A harrow composed of two or more sections, with the beams thereof arranged to operate obliquely to the line of travel, in combination with the connection L, having the front ends of adjoining sections of the harrow attached thereto by hinge or loose joint connections, uniting said sections each one with the other at their inner front corners and to the draft-bar in advance thereof, substantially as and for the purpose specified.

2. A harrow composed of two or more sections placed side by side, with the beams thereof arranged to operate obliquely to the line of travel, in combination with the link or coupling L, hinging the inner front corners of the adjoining sections each one with the other, and connecting the front ends of said sections to the draft-bar, and the V-shaped connections which unite the outer front corners of the harrow-sections to the ends of said draft-bar, whereby lateral motion of the sections is prevented, substantially as described.

3. A harrow composed of two or more sections placed side by side, with the beams thereof arranged to operate obliquely to the line of draft, in combination with the connection L and brace M', hinging the inner front ends of the adjoining sections each one with the other and uniting said sections to the draft-bar, substantially as set forth.

4. A harrow composed of two or more sections placed side by side, with the beams thereof arranged to operate obliquely to the line of travel, with the triangular connection L, having the inner front corners of the adjoining sections hinged to the rear ends thereof and hinged to the transverse draft-bar in front of said sections, substantially as described.

5. In a harrow, the connection L, having its two rear corners hinged to the inner front corners of adjoining oblique sections, uniting said harrow-sections together and to the transverse draft-bar by a hinged-joint connection, whereby independent motion is permitted between said sections in a vertical direction only, substantially as described.

6. The combination of a harrow composed of two or more sections placed side by side, with the beams thereof arranged to operate obliquely to and in opposite directions from each other on either side of the central line of travel, with the extension or connection L, hinging the inner front corners of the adjoining sections together and to the draft-bar, and the outer front connections which unite said sections to the ends of the transverse draft-bar, arranged in advance thereof, substantially as described.

7. The combination, with a harrow tooth and beam, of the plate B, having the openings H, through diagonally-opposite corners and the lugs F on its other two corners, and the pronged clamp D, which extends diagonally across the face of the plate, said clamp being adapted to support the tooth in a vertical position, and the lugs adapted to support it in an inclined position, substantially as described.

8. The combination of the harrow-beams, the toothed plate B, having stop-flanges G, openings H through diagonally-opposite corners, the lugs F, and the pronged clamp D, which extends across the face of the plate, said clamp being adapted to support the tooth in a vertical position, and the lugs adapted to support it in an inclined position, substantially as described.

9. The combination of the beam A, bevel-sided stops A''', and harrow-tooth having the bearing sides B', beveled edges B'', and cutting edges B''', substantially as described.

10. A harrow-tooth having bearing sides B', beveled edges B'', and cutting-edges B''', substantially as described.

11. A harrow-tooth having bearing sides B', beveled edges B'', and cutting-edges B''', the bearing sides being arranged obliquely, so as to cause the cutting-edges of the teeth to run in a line with each other when the tooth is secured to an oblique beam, substantially as described.

In testimony whereof I affix my signature in presence of two witnesses.

JAMES H. BARLEY.

Witnesses:
J. M. BYLER,
M. M. BYLER.